United States Patent
Kim et al.

(10) Patent No.: US 9,302,916 B2
(45) Date of Patent: Apr. 5, 2016

(54) METHOD FOR PREPARING ROD-LIKE SILICA FINE PARTICLES INCLUDING CARBON

(71) Applicant: Hyundai Motor Company, Seoul (KR)

(72) Inventors: Sang-Young Kim, Gyeonggi-do (KR); Se-Jung Kim, Suwon (KR); Gi-Ra Yi, Suwon (KR); Seung-Hyun Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 396 days.

(21) Appl. No.: 13/873,595

(22) Filed: Apr. 30, 2013

(65) Prior Publication Data

US 2014/0183424 A1 Jul. 3, 2014

(30) Foreign Application Priority Data

Dec. 27, 2012 (KR) .................. 10-2012-0154795

(51) Int. Cl.
*C04B 35/64* (2006.01)
*C01B 33/18* (2006.01)

(52) U.S. Cl.
CPC ............. *C01B 33/18* (2013.01); *C01P 2004/10* (2013.01)

(58) Field of Classification Search
USPC ................................... 252/583; 264/639, 682
See application file for complete search history.

(56) References Cited

U.S. PATENT DOCUMENTS 7,910,082 B2 * 3/2011 Dawes et al. ................. 423/346
2010/0092830 A1 * 4/2010 Hayashi et al. ................. 429/30

FOREIGN PATENT DOCUMENTS

KR 10-2004-0108258 12/2004
KR 10-2006-0130612 12/2006

OTHER PUBLICATIONS

Kuijk et al., Synthesis of monodisperse, rodlkie silica colloids with tunable aspect ratio, J. Am. Chem. Soc. 2011, 133, 2346-2349.*
Zhang et al., Facile one-pot synthesis of mesoporous hierarchically structured silca/carbon nanomaterials, J. Mater. Chem., 2012, 22, 13918.*
Kuijk, A. et al., "Synthesis of Monodisperse, Rodlike Silica Colloids with Tunable Aspect Ratio", Jrl. of the Amer. Chem. Soc., 2011, 133, 2346-2349.
Zhang, X. et al., "Facile one-pot synthesis of mesoporous hierarchically structured silica/carbon nanomaterials", M. of Materials Chemistry, 2012, 22, 13918-13921.

* cited by examiner

*Primary Examiner* — Monique Peets
(74) *Attorney, Agent, or Firm* — Mintz Levin Cohn Ferris Glovsky and Popeo, P.C.; Peter F. Corless

(57) ABSTRACT

Disclosed is a method for preparing rod-like silica fine particles including carbon, the method including: a first step of preparing a mixed solvent by mixing a surfactant with alcohol, and then preparing a mixed solution by adding water, ethanol, ammonia water and a salt to the mixed solvent; a second step of forming rod-like silica fine particles by adding a silica precursor to the mixed solution; and a third step of carbonizing the rod-like silica fine particles, and through a sol-gel reaction of the silica precursor and a carbonization process thereof.

7 Claims, 3 Drawing Sheets

METHOD FOR PREPARING ROD-LIKE SILICA FINE PARTICLES INCLUDING CARBON

CROSS-REFERENCE TO RELATED APPLICATIONS

The present application claims priority to Korean Patent Application No. 10-2012-0154795, filed on Dec. 27, 2012, the entire contents of which is incorporated herein for all purposes by this reference

BACKGROUND OF THE INVENTION

1. Field of the Invention

The present invention relates to a method for preparing rod-like silica fine particles including carbon, and more particularly, to a method for preparing rod-like silica fine particles including carbon by adding water, ethanol, ammonia water and the like to a mixed solvent including a surfactant, and then subjecting the mixture to a sol-gel reaction of a silica precursor and a carbonization process thereof.

2. Description of the Related Art

In general, glass is mounted on the front side, rear side, and left and right sides of an automobile in order to view the internal and external environment of the automobile.

Recently, interest has increased in the smart glass-related technology, which may control the transmittance of light therethrough. The smart glass-related technology is largely classified into a liquid crystal technology, an electrochromic technology, a photochromic technology, a thermochromic technology, a polarized particle technology, and the like.

According to the liquid crystal technology, the alignment of liquid crystal molecules may be changed by applying a voltage to anisotropic liquid crystal molecules contained in a liquid crystal panel. While this technology changes the transmittance of light, it is problematic in that the thickness of the resulting glass is usually large, the durability is weak, and it is difficult to implement bending thereof.

According to the electrochromic technology, the color of a material is changed by using electrochemical reactions. This technology is advantageous in that visibility is high enough at a level similar to paper printing, and driving voltage is also very low. However, the reaction rate of coloration and decoloration is low, an afterimage remains during the decoloration, and the like.

According to the thermochromic technology, color, color strength, UV light transmittance and the like are changed with reversible optical properties that appear at any temperature as a starting point. However, this technology is disadvantageous in that it is possible to control the color, color strength, UV light transmittance and the like only by means of heat.

The polarized particle technology provides the best light shielding properties and response speed, and further provides excellent characteristics even from the viewpoint of productivity, such as durability, manufacturing costs, enlargement of an area and the like. However, this technology is problematic in that the driving voltage is 30 V or more and it is necessary to supply electricity steadily.

SUMMARY OF THE INVENTION

The present invention provides a method for preparing rod-like silica fine particles which is applicable to the preparation of smart glass and the like. In particular, the rod-like silica fine particles include a carbonized layer on the surface thereof. According to the present invention, the behavior of fine particles is easily controlled by application of an external electric field or magnetic field.

According to one aspect, the present invention provides a method for preparing rod-like silica fine particles including carbon, including: a first step of preparing a mixed solvent by mixing a surfactant with alcohol, and then preparing a mixed solution by adding water, ethanol, ammonia water and a salt to the mixed solvent; a second step of forming rod-like silica fine particles by adding a silica precursor to the mixed solution; and a third step of carbonizing the rod-like silica fine particles.

As the surfactant, any conventional surfactants can be used in suitable amounts. According to an exemplary embodiment of the present invention, the surfactant is polyvinylpyrrolidone. It is further preferred that the surfactant is present in an amount of about 1 to 20% by weight based on the total weight of the mixed solution.

As the alcohol, any conventional alcohols can be used in suitable amounts. According to an exemplary embodiment of the present invention, the alcohol includes one or more selected from the group consisting of propanol, butanol, pentanol, and isomers thereof.

As the salt, any conventional salts can be used in suitable amounts. According to an exemplary embodiment of the present invention, the salt is sodium citrate.

According to various embodiments of the present invention, the second step further includes a step of controlling an aspect ratio of the formed rod-like silica fine particles.

As the silica precursor, any conventional silica precursors can be used in suitable amounts. According to an exemplary embodiment of the present invention, the silica precursor is tetraethyl orthosilicate (TEOS).

According to the present invention, it is possible to mass-produce rod-like fine particles having a uniform size, and to control the amount of light transmitted thereby by controlling the behavior of the fine particles using an electric field or a magnetic field.

Further, when rod-like fine particles are prepared, it is possible to control the structure of fine particles, such as aspect ratio, size and the like, by controlling the amount or concentration of water, ammonia water, a salt, and the like.

Other features and aspects of the present invention will be apparent from the following detailed description, drawings and claims.

Figure 1:
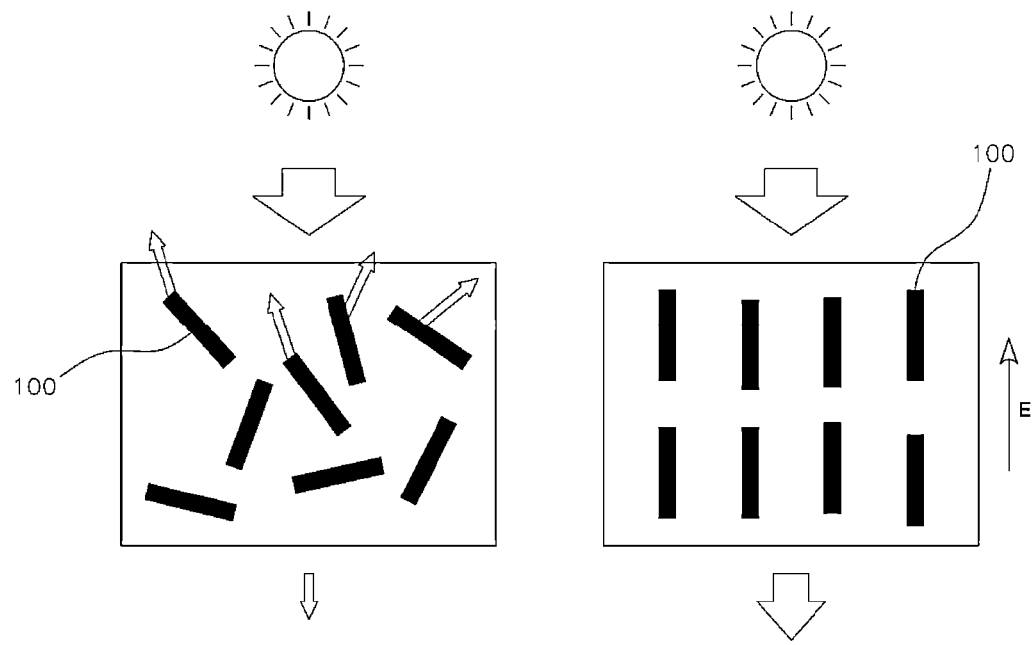
FIG. 1 is a schematic view illustrating a principle that the amount of light transmitted is controlled by rod-like silica fine particles including carbon according to embodiments of the present invention.

It should be understood that the appended drawings are not necessarily to scale, presenting a somewhat simplified representation of various preferred features illustrative of the basic principles of the invention. The specific design features of the invention as disclosed herein, including, for example, specific dimensions, orientations, locations and shapes, will be determined in part by the particular intended application and use environment. The specific solar cell type of the invention as disclosed herein will be determined in part by the particular intended application and use environment.

In the figures, reference numerals refer to the same or equivalent parts of the disclosure throughout the several figures of the drawings.

DETAILED DESCRIPTION OF THE EMBODIMENTS

Terms or words used in the present specification and claims should not be interpreted as being limited to typical or dictionary meanings, but should be interpreted as having meanings and concepts, which comply with the technical spirit of the present invention, based on the principle that an inventor can appropriately define the concept of the term to describe his/her own invention in the best manner.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, the present invention will be described in detail with reference to the accompanying drawings.

In an aspect, the present invention relates to a method for preparing rod-like silica fine particles including carbon.

In particular, the present invention provides a method for preparing rod-like silica fine particles including carbon by preparing rod-like silica fine particles through a sol-gel reaction in a mixed solution in which a surfactant, alcohol, ammonia, a salt and the like are mixed, followed by subjecting the rod-like silica fine particles to a carbonization process.

FIG. 1 is a schematic view illustrating a principle that the amount of light transmitted is controlled by the rod-like silica fine particles including carbon according to the present invention. As illustrated in FIG. 1, the amount of light transmitted is controlled by controlling the alignment of fine particles by an external magnetic field or electric field. In the figure, the size of the arrow represents the intensity of light.

Figure 2:
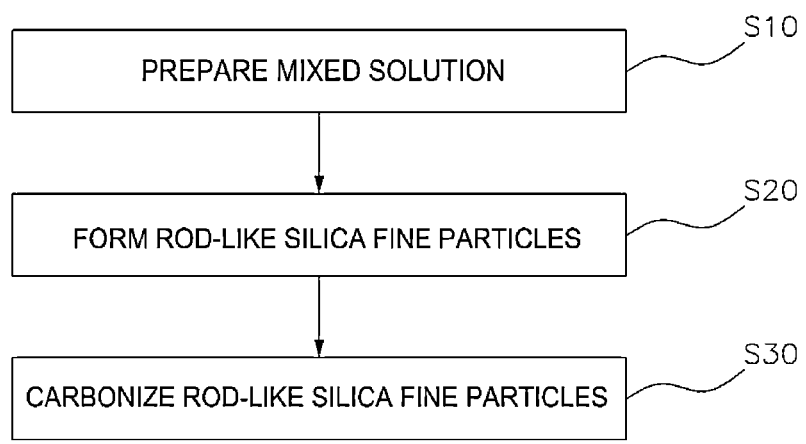
FIG. 2 is a flowchart illustrating a method for preparing rod-like silica fine particles according to an embodiments of the present invention.

FIG. 2 is a flowchart illustrating a method for preparing rod-like silica fine particles according to an embodiment of the present invention. The present invention will be described in further detail below in connection with FIG. 2. It is noted that while the process is described as three "steps" each individual "step" can also be understood to mean to a process that can include one or more steps therein.

(1) First step of preparing a mixed solution (S10)

This is a step of preparing a mixed solvent by mixing a surfactant with alcohol, and then preparing a mixed solution by injecting water, ethanol, ammonia water and a salt into the mixed solvent.

While the surfactant can include any conventional surfactant and can be included in any suitable amounts, according to a preferred embodiment, the surfactant is polyvinylpyrrolidone. Further, it is more preferred that the surfactant is present in an amount of about 1 to 20% by weight based on the total weight of the mixed solution. The polyvinylpyrrolidone is frequently used to form rod-like inorganic and metal oxides, and when the reaction temperature is also increased, the growth of silica fine particles is further enhanced, thereby further increasing the aspect ratio thereof. As such, the present method can be carried out while varying reaction conditions so as to provide a desired aspect ratio.

While the alcohol can include any conventional alcohol and can be included in any suitable amounts, according to a preferred embodiment, the alcohol includes one or more selected from the group consisting of propanol, butanol, pentanol, and isomers thereof, and the alcohol is more preferably pentanol, such as n-pentanol and the like. According to an exemplary embodiment, the salt is sodium citrate.

Specifically, when the surfactant is dissolved in an amount of about 1 to 20% by weight based on the total weight of the mixed solution in n-pentanol, water, ammonia water, and about 0.18 mol of sodium citrate is added thereto, followed by stirring by hand for about 30 seconds, a fine emulsion including ammonia in the surfactant is formed.

Air bubbles are typically generated during the formation of the emulsion. After removal of the air bubbles, a solution for injecting a silica precursor is prepared.

(2) Second step of forming rod-like silica fine particles (S20)

This is a step of forming rod-like silica fine particles by adding a silica precursor to the mixed solution prepared in the first step.

While the silica precursor 1 can include any conventional silica precursor and can be included in any suitable amounts, according to a preferred embodiment, the silica precursor is tetraethyl orthosilicate (TEOS).

Specifically, the silica precursor is added to the mixed solution, and then the entire solution is stirred. At the moment when the silica precursor is added to the mixed solution, silica nuclei are formed. The silica precursor may be uniformly dispersed in the entire mixed solution through a suitable mixing process such as stirring. It is preferred that the mixture is reacted for about 12 hours.

During the process of mixing (e.g. stirring), silica fine particles are grown in a predetermined direction centered at the silica nuclei. Thus, it is possible to control the aspect ratio of rod-like silica fine particles by controlling the amount of the ammonia water, water, and silica precursor added, and/or the concentration and amount of sodium citrate.

After the reaction is completed, ethanol is added thereto, and then a reaction product is obtained through centrifugation.

(3) Third step of carbonizing the rod-like silica fine particles (S30)

This is a step of forming a carbonized layer on the surface of the rod-like silica fine particles by carbonizing the rod-like silica fine particles obtained in the second step.

Specifically, after ethanol is removed (e.g. evaporated by storing the rod-like silica fine particles at about 65° C. in an oven for approximately 24 hours), unreacted carbon chains present on the surface of silica rods of the obtained reaction product and within the particles thereof are sintered at an elevated temperature for a suitable period of time (e.g. about 500° C. for about 3 hours). The sintered product is then uniformly distributed in a fluorine-based oil through a suitable process, such as ultrasonication.

Hereinafter, the present invention will be described in more detail through Examples. These Examples are only for illustrating the present invention, and it will be obvious to those skilled in the art that the scope of the present invention is not interpreted to be limited by these Examples.

Example 1

1 g of polyvinylpyrrolidone was dispersed in 10 ml of n-pentanol at normal temperature (i.e. room temperature). When the dispersion was mixed with pentanol in order to disperse the resulting polymer and then the resulting dispersion was subjected to ultrasonication for 2 hours, a uniform solution was obtained.

In order to form an emulsion such that silica may form and grow nuclei in the polymer solution, 0.28 ml of water, 1 ml of ethanol, 0.2 ml of ammonia water (28 to 30%), and 0.1 ml of sodium citrate (0.18 M) were all added thereto, and the mixture was stirred by hand for 30 seconds. Air bubbles formed during the stifling process were left to stand at normal temperature for 5 minutes, and then removed.

Example 2

0.1 ml of tetraethyl orthosilicate (TEOS, silica precursor) was added to the mixed solution obtained through the process in Example 1 and then the entire mixed solution was stirred by shaking the solution by hand, and left to stand at normal temperature for 12 hours.

Figure 3:
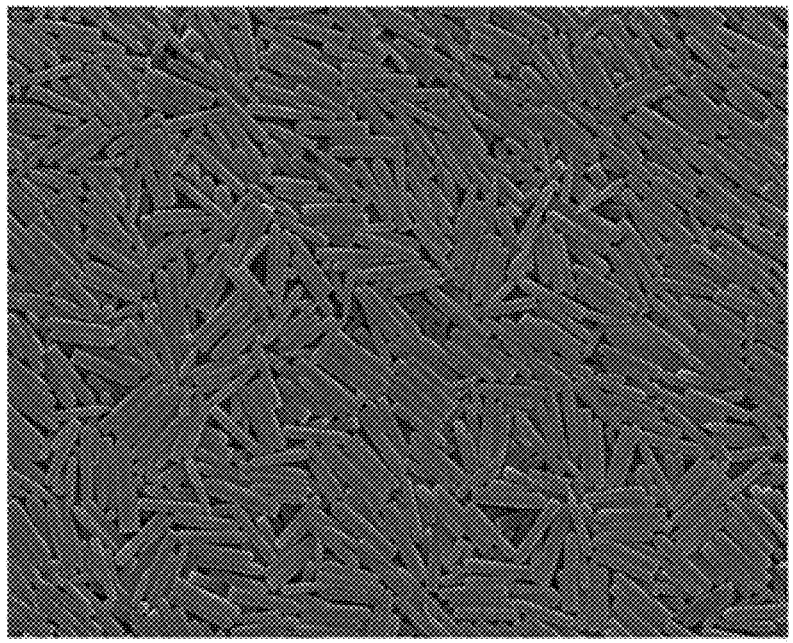
FIG. 3 is a scanning electron microscope photograph of fine particles prepared according to Example 2 of the present invention.

Ethanol was added to the mixed solution in which the reaction had been completed, and a precipitate was obtained by subjecting the resulting solution to centrifugation under conditions of 6,000 rpm for 20 minutes. In order to obtain only rod-like silica fine particles, ethanol was added thereto again, and the resulting solution was dispersed again through ultrasonication. Thereafter, the solution was centrifuged under conditions of 2,000 rpm for 5 minutes, and silica fine particles with a uniform size were obtained by performing the above process (i.e., the process of centrifuging under conditions of 2,000 rpm for 5 minutes) 5 times in total (FIG. 3).

Example 3

The aspect ratio of silica particles was controlled by controlling the amount of silica precursor added, and the silica precursor was added in an amount of 0.05 ml, 0.1 ml, and 0.2 ml, respectively. In order to observe only the effects of the silica precursor, other conditions, such as ammonia water, sodium citrate, and the like, were maintained without variation.

In the same manner as in Example 2, each silica precursor was added thereto, the resulting solution was uniformly mixed by shaking the mixture by hand, and then the solution was stored at normal temperature for 12 hours. After the reaction was completed, rod-like silica fine particles were obtained through a centrifugal process.

Figure 4:
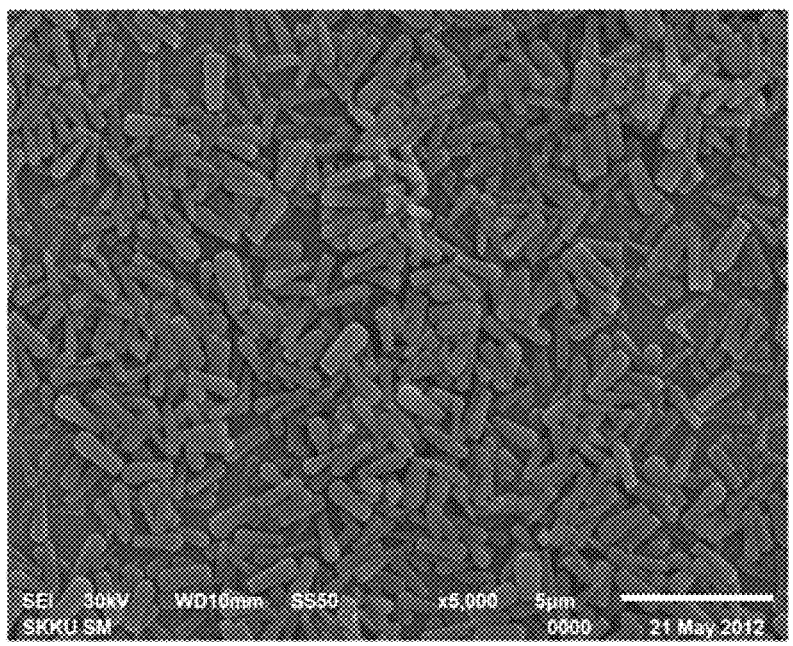
FIGS. 4 to 6 are scanning electron microscope photographs of rod-like silica fine particles prepared by adding a silica precursor in an amount of 0.05 ml, 0.1 ml, and 0.2 ml, respectively, according to exemplary embodiments of the present invention.
Figure 5:
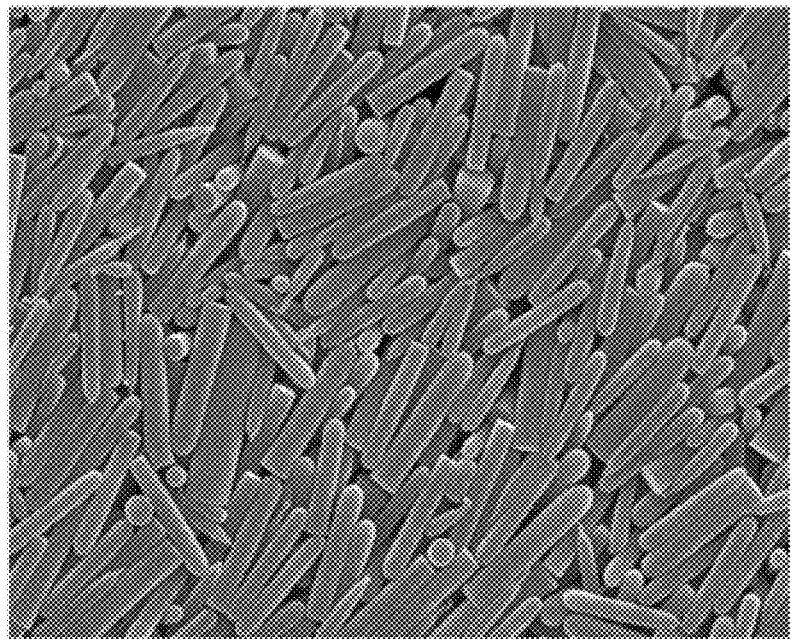
Figure 6:
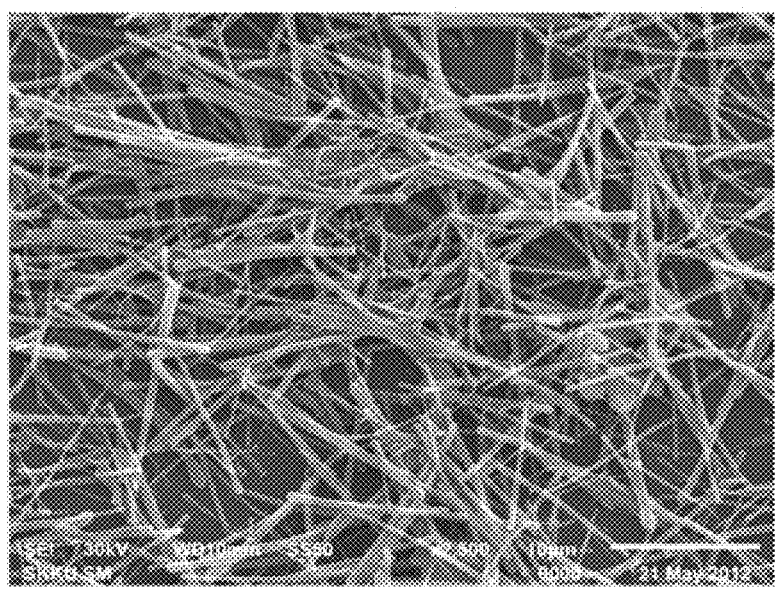

FIGS. 4 to 6 are scanning electron microscope photographs of rod-like silica fine particles prepared by adding a silica precursor in an amount of 0.05 ml, 0.1 ml, and 0.2 ml, respectively, according to exemplary embodiments of the present invention. It was confirmed that the aspect ratio of the rod-like silica fine particles was controlled by the amount of the silica precursor added, as illustrated in the photographs.

Example 4

The rod-like silica fine particles obtained through the Examples 2 and 3 were dried at 65° C. in an oven for 24 hours. In order to carbonize an organic material bound to the surface of the silica, the rod-like silica fine particles were heated in an argon (Ar) gas atmosphere at 5° C./min up to 500° C., and then maintained for 3 hours.

As described above, the present invention has been described in relation to specific embodiments of the present invention, but this is only illustration and the present invention is not limited thereto. Embodiments described may be changed or modified by those skilled in the art to which the present invention pertains without departing from the scope of the present invention, and various alterations and modifications are possible within the technical spirit of the present invention and the equivalent scope of the claims which will be described below.

What is claimed is:

1. A method for preparing rod silica fine particles including carbon, comprising:
    a first step of preparing a mixed solvent by mixing a surfactant with alcohol, and then preparing a mixed solution by adding water, ethanol, ammonia water and a salt to the mixed solvent;
    a second step of forming rod silica fine particles by adding a silica precursor to the mixed solution; and
    a third step of carbonizing the rod silica fine particles.

2. The method of claim 1, wherein the surfactant is polyvinylpyrrolidone.

3. The method of claim 2, wherein the polyvinylpyrrolidone is added in an amount of about 1 to 20% by weight based on a total weight of the mixed solution.

4. The method of claim 1, wherein the alcohol comprises one or more selected from the group consisting of propanol, butanol, pentanol, and isomers thereof.

5. The method of claim 1, wherein the salt is sodium citrate.

6. The method of claim 1, wherein the second step further comprises controlling an aspect ratio of the formed rod-like silica fine particles.

7. The method of claim 1, wherein the silica precursor is tetraethyl orthosilicate (TEOS).

* * * * *